Patented Dec. 10, 1935

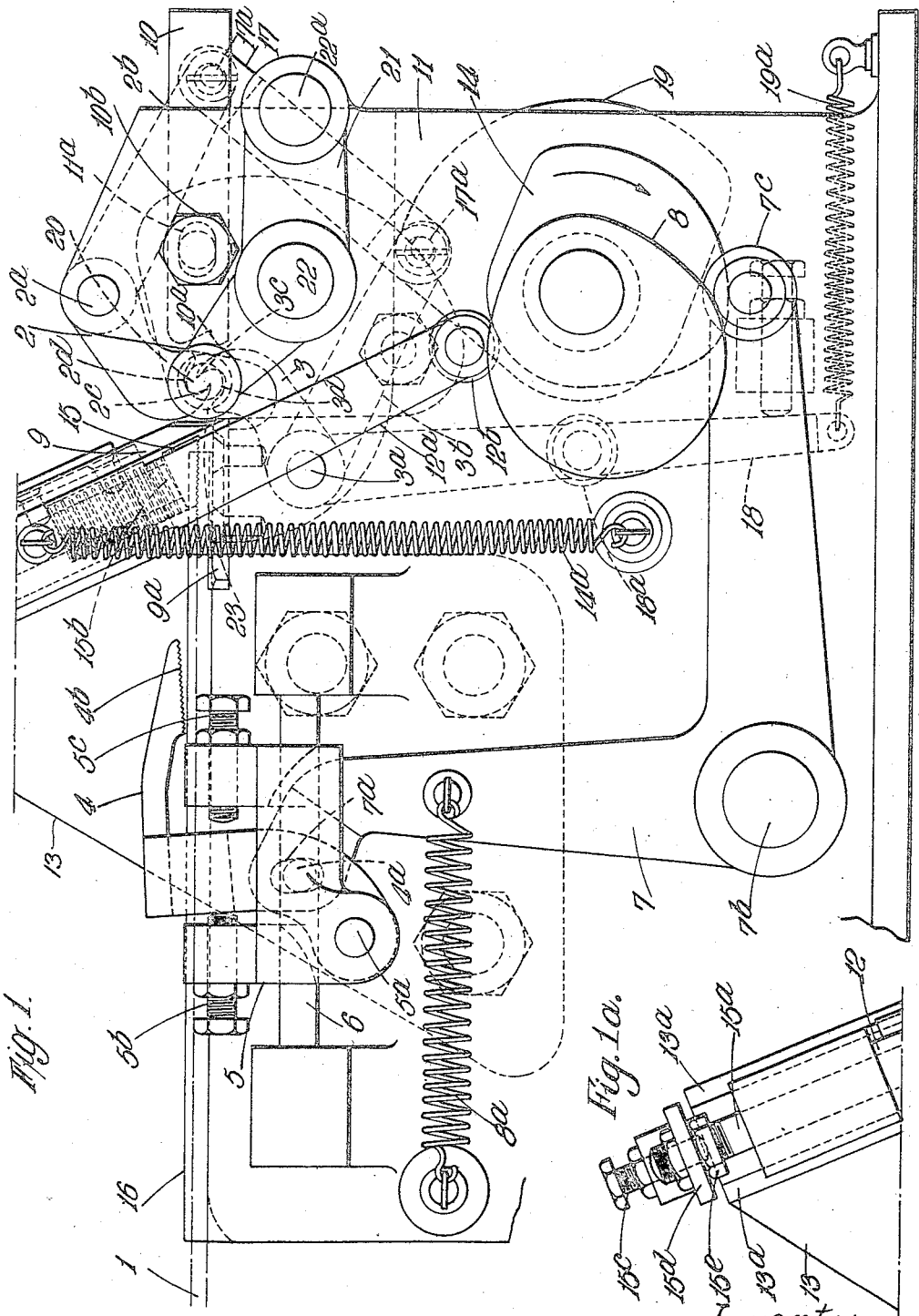

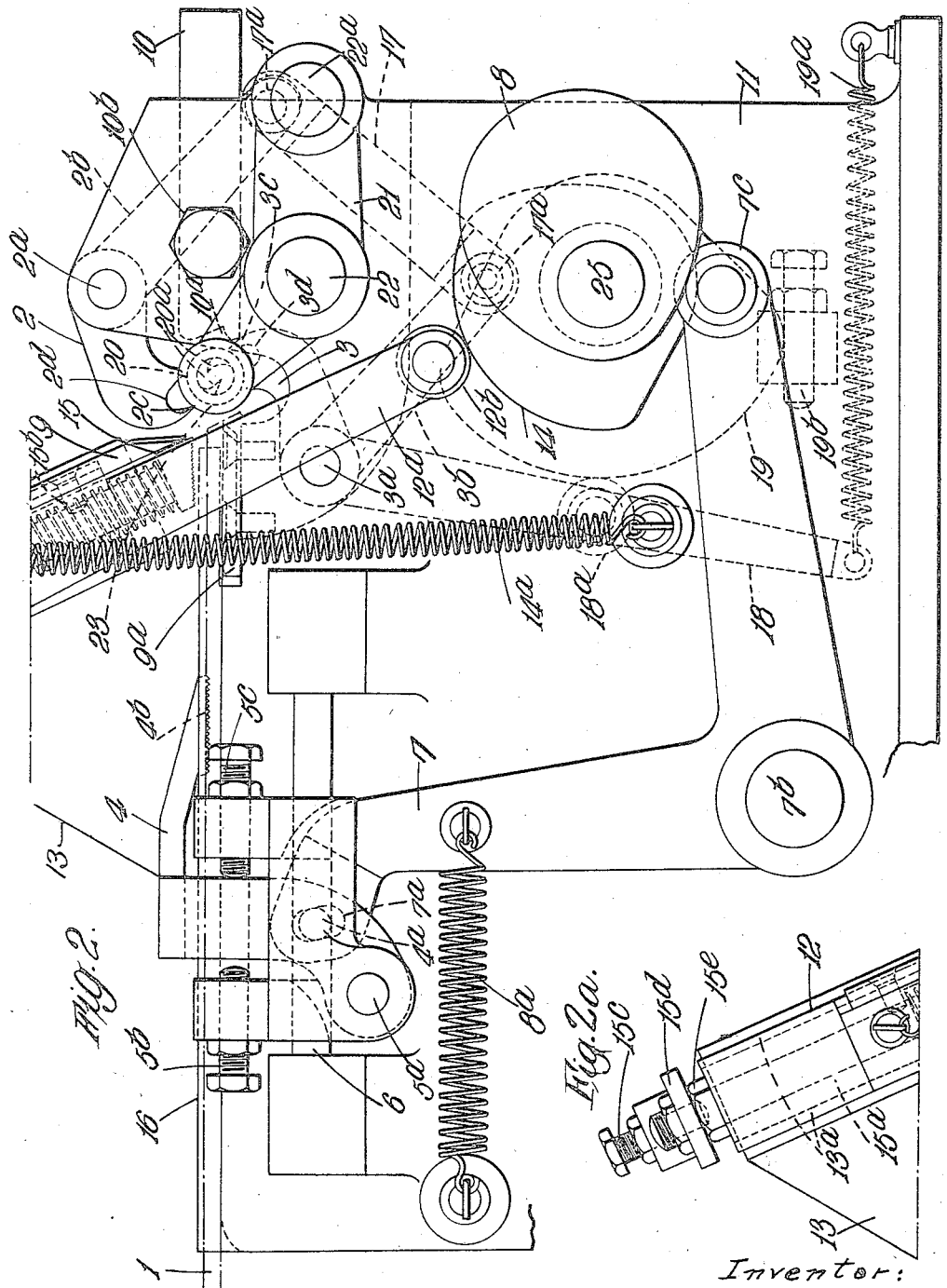

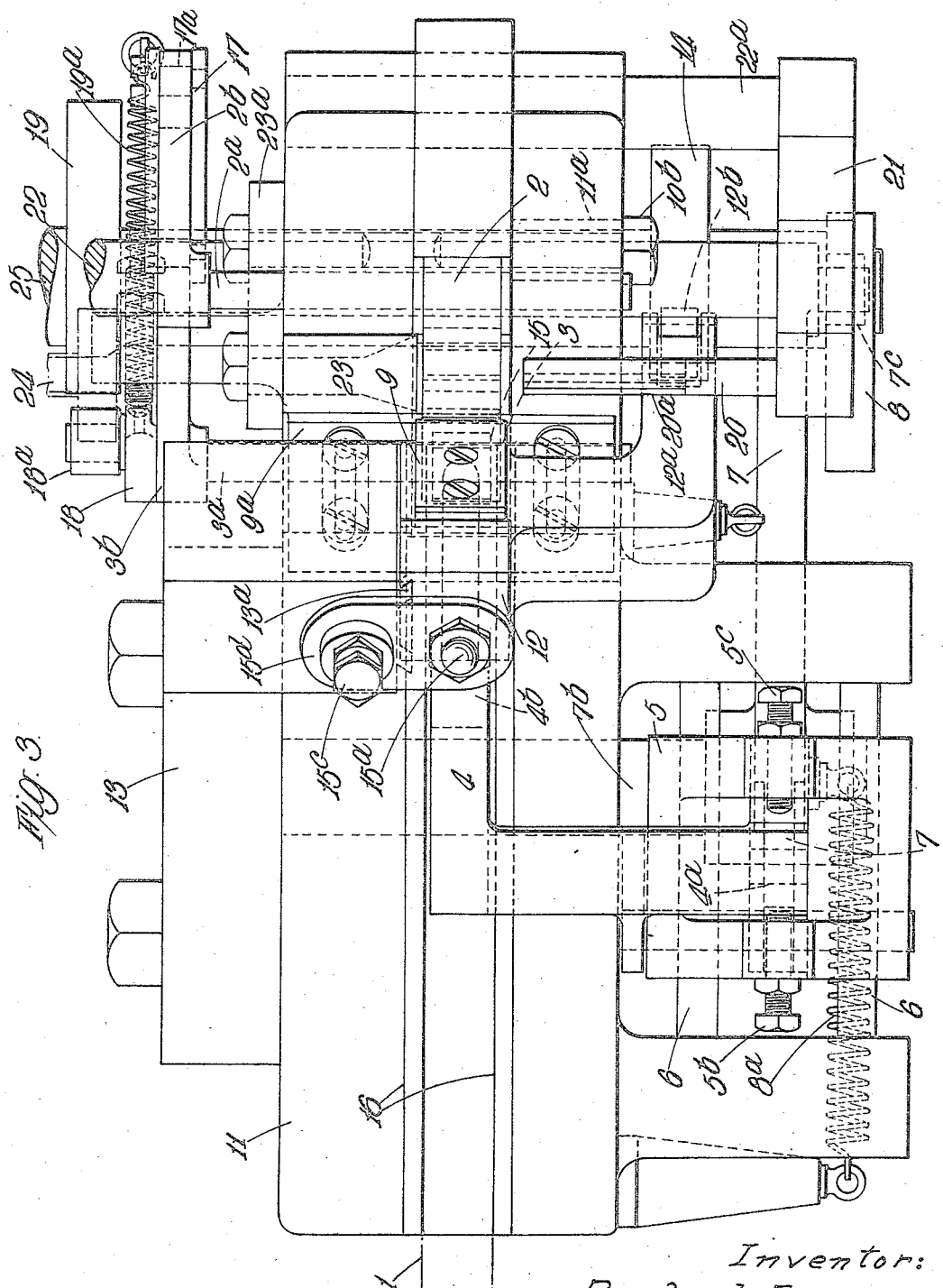

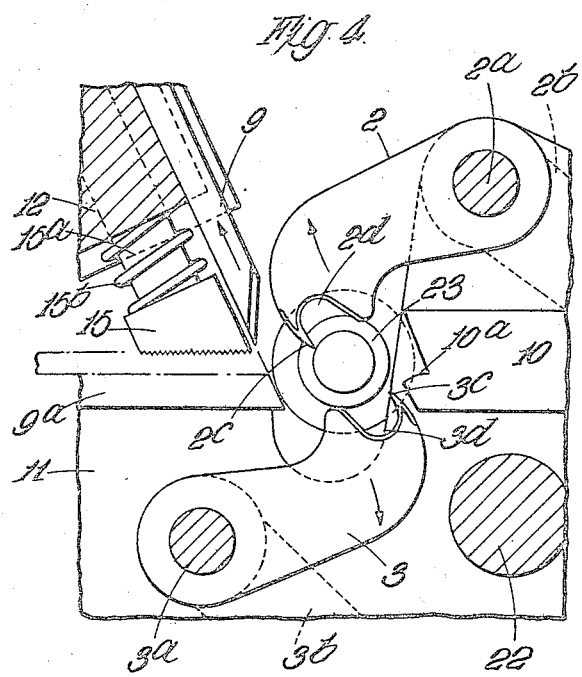
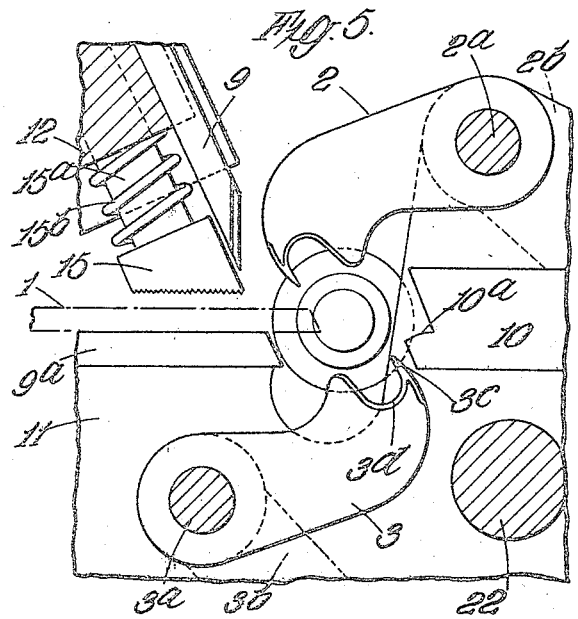

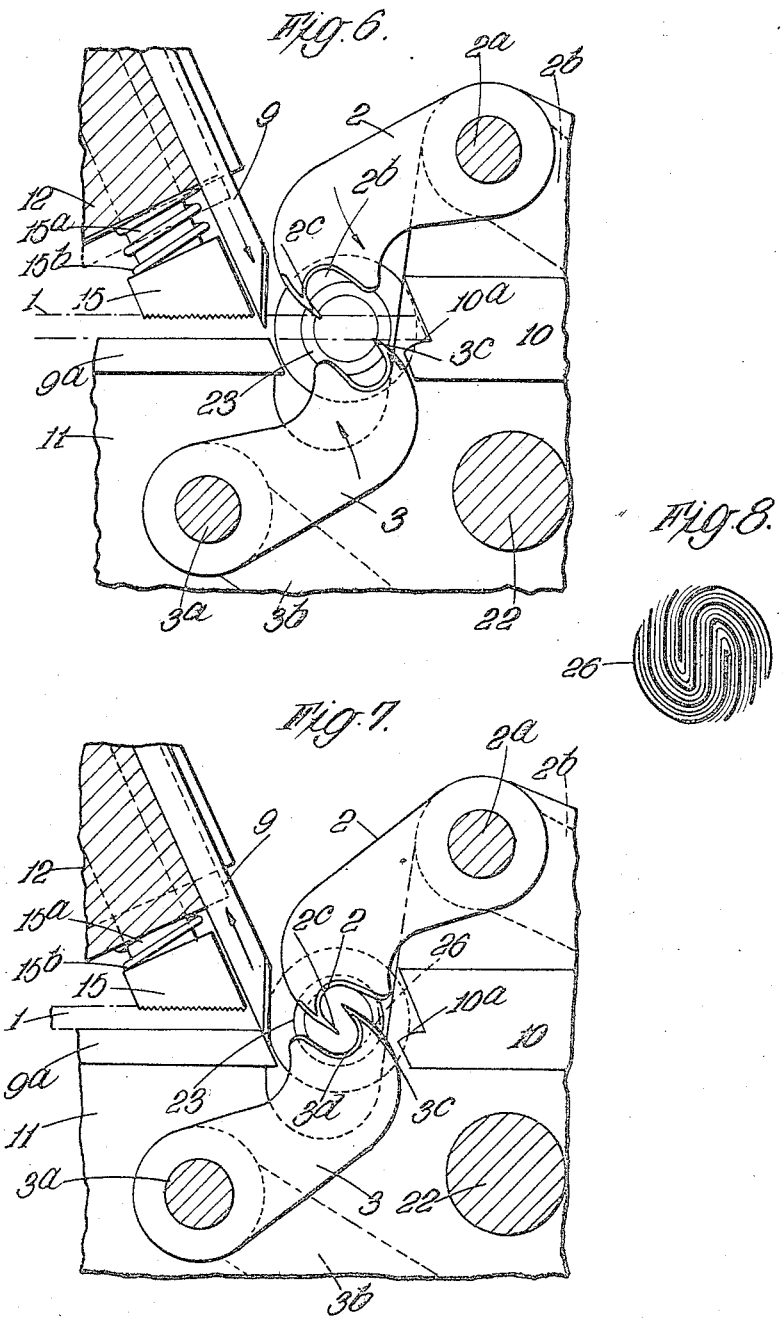

2,023,766

UNITED STATES PATENT OFFICE 2,023,766

MANUFACTURE OF FILTER TIPS FOR CIGARETTES

Rowland Frank May, Middlesex, England, assignor, by mesne assignments, to Filter Tips Limited, London, England, a British company Application July 21, 1933, Serial No. 681,649
In Great Britain July 22, 1932

8 Claims. (Cl. 93—1)

This invention relates to filter tips for cigarettes and has for its object to provide an improved, simple and effective form of filter tip which is capable of being readily manufactured in quantity from strip material.

According to the present invention, the improved filter tip consists of a length of strip material, which may be a composite strip, folded upon itself in S formation and consolidated to a more or less circular cross-section.

The strip material referred to may consist of a single layer of material of the nature of felt or the like, or may consist of a number of layers of composite material, each layer consisting of a number of strips of material, such as of crepe paper, filter paper or the like with or without intervening layers of filtering or absorbent material. Alternatively, the strip material may consist of a plurality of layers of material such as of crepe paper, filter paper or the like with or without intervening layers of filtering or absorbent material.

According to the invention, moreover, apparatus for producing such filter tips comprises a pair of relatively movable forming members adapted to fold a length of the strip material into S formation in one movement. The forming members may be provided with blades adapted to engage opposite sides of the strip material at spaced positions corresponding to the inner folds of the S formation, the forming members being relatively movable in such manner as to turn the intermediate portion of the strip between the blades through an angle and so that when the forming members are closed together the adjacent faces of the blades are substantially parallel with the intermediate part of the strip confined between them, the forming members also being provided with troughs or channels co-operating with the respective blades so as to fold the outer portions of the length of strip material to produce the S formation. Advantageously both forming members are movable towards and away from one another and are carried or constituted by pivoted arms interconnected by mechanism arranged to move the arms equally towards and away from an axis corresponding to the median line along which the strip material is fed between the forming members.

The invention is hereinafter described by way of example with reference to the accompanying diagrammatic drawings, in which:—

Figures 1 and 1ª taken together represent a side elevation illustrating one embodiment of apparatus in accordance with the invention and showing the parts in the relative positions occupied after a length of strip material has been folded to an S formation and before the axial ejection of the same from the forming means;

Figures 2 and 2ª taken together represent a view similar to Figures 1 and 1ª, bua showing the parts in the relative positions occupied during the feed of the strip material between the forming members;

Figure 3 is a plan view corresponding to Figure 1;

Figure 4 is a fragmentary longitudinal section drawn to an enlarged scale and showing the cutting and forming members opening to receive a length of strip material;

Figure 5 is a view similar to Figure 4 showing the positions of the parts during the feed of the strip material between the forming members;

Figure 6 is a similar view showing the positions of the parts at the commencement of the folding operation;

Figure 7 is a similar view showing the positions of the parts when the folding operation is completed; and Figure 8 is an enlarged end view of a filter tip in accordance with the invention formed, for example, from a plurality of layers of a composite material, each layer consisting of a number of strips of crepe paper or the like with or without intervening layers of filtering or absorbent material.

In carrying the invention into effect according to one embodiment and with reference to the accompanying diagrammatic drawings, the strip 1 of material is fed lengthwise between forming members 2, 3 by a reciprocating feed member 4 consisting of a suitably shaped lever having a serrated or other suitable face 4b for engaging with the top of the strip material and pivoted at 5a to a carriage 5 slidable on rods 6. Angular movement of the lever 4 about the pivot 5a is limited by means of adjustable stops 5b, 5c on the carriage 5. A bell crank lever 7 pivoted on a spindle 7b and slotted at 7a to co-operate with a transverse pin 4a on the lever 4 is provided with a roller 7c which is acted on by the cam 8, the return movement of the lever 7 being effected by the spring 8a.

It will be understood that on the rearward stroke of the carriage 5 under the influence of the spring 8a the part 4b of the lever 4 is raised clear of the strip 1, while on the forward stroke under the action of the cam 8 the lever 4 is first caused to engage the strip 1 to the extent determined by the stop 5c and thereafter the carriage 5 is moved forward, the strip 1 being also carried forward by the engagement therewith of the part 4b. The pressure of the part 4b on the strip 1 may be regulated by adjusting the stop 5c, while the length of material fed at each stroke may be adjusted by the stop 5b which has the effect of increasing or decreasing the lost motion between the lever 7 and the carriage 5.

During the feeding movement, as shown in Figures 2 and 5, the guillotine knife 9 or other cutter is raised and the forming members 2, 3 are opened so that the material 1 may pass freely between the members 2, 3 up to a stop 10 preferably having a ledge 10a for locating the free end of the strip. The stop 10 may be adjustable longitudinally and fixed, for example, by means of a bolt 10b passing through a slot 11a in the wall of the main frame 11.

The knife 9 may be carried by a reciprocable member 12 sliding in guides 13a in a support 13, the member 12 conveniently having an extension 12a provided at the lower end with a roller 12b co-operating with the cam 14, a return spring 14a being provided to ensure the downward cutting movement of the knife 9. As shown, the knife 9 preferably is arranged to reciprocate at an inclination so that the edge of the severed length of strip material is bevelled to facilitate the final consolidation of the strip to a more or less circular cross-section as shown in Figure 8. In order to hold the material behind the knife 9 while the latter is cutting and while it is withdrawn upwardly, a presser member 15 is mounted at the lower end of a rod 15a slidable in a bore in the member 12 and normally pressed downwards by means of a spring 15b. Downward movement of the member 15 is limited by the engagement of an adjustable stop 15c carried by a laterally extending bracket 15d on the rod 15a with the top of the support 13. The position at which the presser member 15 commences to move upwardly with the knife 9 is determined, for example, by the engagement of a nut 15e or similar adjustable stop with the top of the member 12. The member 15 also serves to prevent rearward movement of the strip 1 while the return stroke of the carriage 5 under the influence of the spring 8a is taking place.

The knife 9 co-operates with a fixed adjustable blade 9a and the strip 1 may be guided laterally by means of members 16 which preferably extend adjacent to the cutter.

The forming members 2, 3 are in the form of arms pivoted respectively on spindles 2a, 3a and connected together, for example, by means of arms 2b, 3b fixed to the respective spindles and extending approximately parallel with one another and connected at their ends by links 17 preferably having means of adjustment such as eccentric pivots 17a. On the spindle 3a a lever arm 18 is fixed, such arm having a roller 18a for co-operation with the cam 19 which preferably is arranged to effect the opening movement of the forming members the closing movement of which is effected by means of the spring 19a, an adjustable stop 19b determining the closed position of the forming members 2, 3. The forming members 2, 3 are formed with jaws consisting of folding blades 2c, 3c arranged, as will be seen more particularly in Figure 6, so as to engage opposite sides of the strip material at spaced positions corresponding to the inner folds of the S formation, and co-operating channels 2d, 3d which, as shown more particularly in Figure 7, effect the folding over of the outer parts of the length of strip material.

Referring more particularly to Figures 4 to 7, it will be seen that during the opening movement of the forming members 2, 3 and the upward movement of the knife 9 the presser member 15 holds the strip 1 until the knife 9 is clear thereof and then the member 15 is carried up with the knife so that, as shown in Figure 5, the strip 1 has a clear passage between the forming members 2, 3 up to the stop 10. On the downward movement of the knife 9 the member 15 first comes into engagement with the strip so as to support the same behind the knife 9 and the knife is preferably timed so as to effect the cut approximately at the moment at which the blades 2c, 3c of the forming members engage the opposite sides of the strip 1, as shown in Figure 6. At the conclusion of the folding operation, as shown in Figure 7, it will be seen that the length of strip material cut off by the knife 9 is located between the jaws of the forming members 2, 3 in S formation. This folded strip is wholly or partially ejected axially from between the forming members 2, 3 before the latter are again opened, the ejection being effected by means of a plunger 20 having a part formed with slots 20a (Figures 2 and 3) to accommodate the blades 2c, 3c. The plunger 20 may be carried by a member 21 mounted on slidable rods 22, 22a, the rod 22 being preferably extended to co-operate with a cam or other suitable part of the paper tube-forming and/or filter tip-inserting mechanism. The folded length of strip ejected from between the forming members 2, 3 is pushed by the plunger 20 into a flared receiving tube or ring 23 fixed for example, to a support 23a and may be discharged through the tube or ring 23 into a reciprocatable spoon 24 (Figure 3) by which the filter tip so formed is inserted into the cigarette paper tube or mouthpiece. If desired, however, the transfer of the tip from the tube or ring 23 to the spoon 24 may be effected by the insertion of the following tip into the tube or ring 23.

Advantageously the mechanism is arranged so that the cams 8, 14 and 19 are carried on a single shaft 25 which is interconnected in timed relation with the paper tube-forming and/or filter tip-inserting mechanism.

The formation of the filter tip produced by the mechanism described is shown diagrammatically in Figure 8 which shows a filter tip produced, for example, from strip material consisting of three layers of composite material each consisting of a number of layers of material, such as crepe paper, with or without intervening absorbent substance.

When the strip material employed consists of a number of separate layers, such layers may be drawn from separate supply spools and assembled together to provide a composite strip before reaching the cutting and/or forming means, and such spools may be vertically or horizontally arranged.

It will be understood that the invention is not limited to the particular details hereinbefore described. For example, the filling may be formed of any other suitable material or combination of materials, while the mechanism described for forming the filter tips from strip material may be modified in various ways.

What I claim is:—

1. In an apparatus for folding a strip of material into S formation to produce filter tips, the combination of a pair of forming members, each forming member having a transverse groove formed adjacent one end thereof to provide a transverse blade-like portion at said end, means for supporting and positioning said members so that upon movement toward each other the blade on the end of one member will partially enter the groove adjacent the end of the other member to force a strip of material between the same into S formation, means for relatively moving said forming members toward each other, and means for ejecting the strip while held in S formation from between the forming members.

2. An apparatus for folding strips of material into substantially cylindrical bodies of S shape cross-section, comprising spaced parallel shafts, a forming arm mounted on each shaft, a laterally projecting blade provided at the free end of each arm, each arm having a channel formed in a side face thereof adjacent the blade, said blades and channels extending in a direction parallel to the axes of said shafts, said arms being of a length to cause the blade of one arm to partially enter the channel of the other arm, and means for rocking said arms about the axes of said shafts to bring the channeled sides of said arms toward each other and to press a strip of material between said arms into S formation.

3. An apparatus for folding strips of material into substantially cylindrical bodies of S shape cross-section, comprising spaced parallel shafts, a forming arm mounted on each shaft, a laterally projecting blade provided at the free end of each arm, each arm having a channel formed in a side face thereof adjacent the blade, said blades and channels extending in a direction parallel to the axes of said shafts, said arms being of a length to cause the blade of one arm to partially enter the channel of the other arm, means for rocking said arms about the axes of said shafts to bring the channeled sides of said arms toward each other and to press a strip of material between said arms into S formation, and means interconnecting said arms for effecting simultaneous movement thereof.

4. An apparatus for folding strips of material into substantially cylindrical bodies of S shape cross-section, comprising spaced parallel shafts, a forming arm mounted on each shaft, a laterally projecting blade provided at the free end of each arm, each arm having a channel formed in a side face thereof adjacent the blade, said blades and channels extending in a direction parallel to the axes of said shafts, said arms being of a length to cause the blade of one arm to partially enter the channel of the other arm, means for rocking said arms about the axes of said shafts to bring the channeled sides of said arms toward each other and to press a strip of material between said arms into S formation, a pair of substantially parallel crank arms fixed to the shafts carrying the forming arms, and a link connecting said crank arms for effecting simultaneous movement of said forming arms.

5. Apparatus according to claim 4 wherein the connecting link is adjustable.

6. An apparatus for folding strips of material into substantially cylindrical bodies of S shape cross-section, comprising two forming members each provided with a blade and a groove, means for moving said members in a confined path toward each other to cause the blade of one member to enter the groove of the other member and thereby press a strip of material between said members into S formation, means positioned adjacent the forming members to receive the body from the forming members, and means for ejecting the body laterally from the forming members and forcing it through the receiving means to impart a substantially circular cross-section thereto.

7. An apparatus for folding strips of material into substantially cylindrical bodies of S shape cross-section, comprising spaced parallel shafts, a forming arm mounted on each shaft, a laterally projecting blade provided at the free end of each arm, each arm having a channel formed in a side face thereof adjacent the blade, said blades and channels extending in a direction parallel to the axes of said shafts, said arms being of a length to cause the blade of one arm to partially enter the channel of the other arm, means for rocking said arms about the axes of said shafts to bring the channeled sides of said arms toward each other and to press a strip of material between said arms into S formation, a tubular member positioned at one side of said arms between said shafts with its axis parallel to the shafts, and means on the other side of said arms for forcing an S shaped body from between the forming arms into said tubular member to compress the body into substantially cylindrical form.

8. An apparatus for folding strips of material into substantially cylindrical bodies of S shape cross-section, comprising spaced parallel shafts, a forming arm mounted on each shaft, a laterally projecting blade provided at the free end of each arm, each arm having a channel formed in a side face thereof adjacent the blade, said blades and channels extending in a direction parallel to the axes of said shafts, said arms being of a length to cause the blade of one arm to partially enter the channel of the other arm, means for rocking said arms about the axes of said shafts to bring the channeled sides of said arms toward each other and to press a strip of material between said arms into S formation, a tubular member positioned at one side of said arms between said shafts with its axis parallel to the shafts, and means on the other side of said arms for forcing an S shaped body from between the forming arms into said tubular member to compress the body into substantially cylindrical form, said last-recited means comprising a plunger slotted to avoid engagement with the blades of the forming arms.

ROWLAND FRANK MAY.